(12) United States Patent
Kim et al.

(10) Patent No.: US 8,849,756 B2
(45) Date of Patent: Sep. 30, 2014

(54) SELECTING DATA NODES IN DISTRIBUTED STORAGE SYSTEM

(75) Inventors: Mi-Jeom Kim, Gyeonggi-do (KR); Eo-Hyung Lee, Gyeonggi-do (KR); Jin-Kyung Hwang, Gyeonggi-do (KR)

(73) Assignee: KT Corporation, Gyeonggi-do (KR)

( * ) Notice: Subject to any disclaimer, the term of this patent is extended or adjusted under 35 U.S.C. 154(b) by 129 days.

(21) Appl. No.: 13/446,052

(22) Filed: Apr. 13, 2012

(65) Prior Publication Data
US 2012/0284229 A1 Nov. 8, 2012

(30) Foreign Application Priority Data
Apr. 13, 2011 (KR) .................. 10-2011-0034412

(51) Int. Cl.
G06F 17/00 (2006.01)
G06F 17/30 (2006.01)
H04L 29/08 (2006.01)

(52) U.S. Cl.
CPC ...... *H04L 67/1095* (2013.01); *G06F 17/30575* (2013.01); *G06F 17/30581* (2013.01); *H04L 67/1097* (2013.01)
USPC .......... 707/634; 707/610; 707/640; 707/661; 709/201; 709/223; 709/249

(58) Field of Classification Search
None
See application file for complete search history.

(56) References Cited

U.S. PATENT DOCUMENTS

| | | | |
|---|---|---|---|
| 5,315,601 A | 5/1994 | Lee et al. | |
| 6,047,309 A * | 4/2000 | Dan et al. | 709/201 |
| 6,163,855 A * | 12/2000 | Shrivastava et al. | 714/4.4 |
| 6,185,619 B1 * | 2/2001 | Joffe et al. | 709/229 |
| 6,415,323 B1 * | 7/2002 | McCanne et al. | 709/225 |
| 6,502,125 B1 * | 12/2002 | Kenner et al. | 709/203 |
| 6,665,706 B2 * | 12/2003 | Kenner et al. | 709/203 |
| 7,389,300 B1 * | 6/2008 | Shah et al. | 1/1 |
| 7,457,257 B2 * | 11/2008 | Tang et al. | 370/256 |
| 7,461,147 B1 * | 12/2008 | Mowat et al. | 709/225 |
| 7,650,328 B2 | 1/2010 | Hori et al. | |
| 7,653,700 B1 * | 1/2010 | Bahl et al. | 709/217 |
| 7,739,233 B1 | 6/2010 | Ghemawat et al. | |
| 7,778,183 B2 * | 8/2010 | Fan et al. | 370/238 |
| 7,778,972 B1 * | 8/2010 | Cormie et al. | 707/626 |
| 7,823,009 B1 | 10/2010 | Tormasov et al. | |
| 7,853,770 B2 | 12/2010 | Tajima et al. | |
| 7,945,655 B2 * | 5/2011 | Lisiecki et al. | 709/223 |
| 8,103,636 B2 | 1/2012 | Lee et al. | |
| 8,447,842 B2 * | 5/2013 | Lisiecki et al. | 709/219 |

(Continued)

FOREIGN PATENT DOCUMENTS

JP 2008-059438 A 3/2008
KR 10-1993-0007928 B1 8/1993

(Continued)

*Primary Examiner* — Hung Le
(74) *Attorney, Agent, or Firm* — IP Legal Services, LLC (57) ABSTRACT

The disclosure is related to selecting data nodes in a distributed storage system. A server may be provided in a distributed storage system including a plurality of data nodes for providing a storage service. The server may include a receiver configured to receive a replication request and a control unit configured to select data nodes based on at least one of evaluation results and real-time service statuses of the plurality of data nodes. An evaluation result of each data node may be a sum of points of at least one evaluation item assigned to each data node from evaluation of each data node according to at least one evaluating item.

18 Claims, 4 Drawing Sheets

(56) References Cited

U.S. PATENT DOCUMENTS

| | | | |
|---|---|---|---|
| 8,621,270 B2 * | 12/2013 | Isherwood et al. | 714/6.22 |
| 2002/0184368 A1 * | 12/2002 | Wang | 709/226 |
| 2004/0064633 A1 | 4/2004 | Oota | |
| 2005/0125456 A1 | 6/2005 | Hara et al. | |
| 2005/0256923 A1 | 11/2005 | Adachi | |
| 2006/0047751 A1 | 3/2006 | Chen et al. | |
| 2006/0069828 A1 | 3/2006 | Goldsmith | |
| 2007/0300220 A1 | 12/2007 | Seliger et al. | |
| 2008/0021935 A1 | 1/2008 | Geelen et al. | |
| 2008/0317068 A1 | 12/2008 | Sagar et al. | |
| 2009/0106411 A1 * | 4/2009 | Lisiecki et al. | 709/223 |
| 2009/0144579 A1 | 6/2009 | Swanson | |
| 2010/0058341 A1 | 3/2010 | Jung et al. | |
| 2010/0076933 A1 | 3/2010 | Hamilton et al. | |
| 2010/0161759 A1 | 6/2010 | Brand | |
| 2010/0274762 A1 | 10/2010 | Murphy et al. | |
| 2010/0318609 A1 | 12/2010 | Lahiri et al. | |
| 2010/0325199 A1 | 12/2010 | Park et al. | |
| 2010/0333116 A1 | 12/2010 | Prahlad et al. | |
| 2011/0106904 A1 * | 5/2011 | Resch et al. | 709/207 |
| 2011/0106909 A1 * | 5/2011 | Gladwin | 709/217 |
| 2011/0202741 A1 | 8/2011 | Tajima et al. | |
| 2012/0158882 A1 * | 6/2012 | Oehme et al. | 709/213 |
| 2012/0185437 A1 * | 7/2012 | Pavlov et al. | 707/652 |
| 2012/0203888 A1 * | 8/2012 | Balakrishnan et al. | 709/224 |
| 2013/0232115 A1 * | 9/2013 | Voutilainen et al. | 707/638 |

FOREIGN PATENT DOCUMENTS

| | | |
|---|---|---|
| KR | 10-1993-0023826 A | 12/1993 |
| KR | 10-2001-0091593 A | 10/2001 |
| KR | 10-2004-0028594 A | 4/2004 |
| KR | 10-2005-0033615 A | 4/2005 |
| KR | 10-2007-0012544 A | 1/2007 |
| KR | 10-2007-0032734 A | 3/2007 |
| KR | 10-0719285 B1 | 5/2007 |
| KR | 10-2007-0067069 A | 6/2007 |
| KR | 10-2007-0108133 A | 11/2007 |
| KR | 10-2009-0036276 A | 4/2009 |
| KR | 10-2009-0062747 A | 6/2009 |
| KR | 10-0923394 B1 | 10/2009 |
| KR | 10-0931260 B1 | 12/2009 |
| KR | 10-2010-0025980 A | 3/2010 |
| KR | 10-2010-0055297 A | 5/2010 |
| KR | 10-2010-0060304 A | 6/2010 |
| KR | 10-2010-0060715 A | 6/2010 |
| KR | 10-2010-0069234 A | 6/2010 |
| KR | 10-2010-0073154 A | 7/2010 |
| KR | 10-2010-0092850 A | 8/2010 |
| KR | 10-0985169 B1 | 10/2010 |
| KR | 10-2010-0122197 A | 11/2010 |
| KR | 10-2010-0137323 A | 12/2010 |
| KR | 10-1023585 B1 | 3/2011 |

* cited by examiner

SELECTING DATA NODES IN DISTRIBUTED STORAGE SYSTEM

CROSS REFERENCE TO PRIOR APPLICATIONS

The present application claims priority under 35 U.S.C. §119 to Korean Patent Application No. 10-2011-0034412 (filed on Apr. 13, 2011), which is hereby incorporated by reference in its entirety.

FIELD OF THE INVENTION

The present invention relates to distributed storage systems and in particular, to selecting data nodes in a distributed storage system.

BACKGROUND OF THE INVENTION

Cloud computing may be referred to as a service that provides various information technology (IT) resources distributed over an Internet. The most common cloud computing service models may include Infrastructure as a Service (IaaS), Platform as a Service (PaaS), and Software as a Service (SaaS). The IaaS may provide hardware infrastructure as a service. The PaaS may provide application development and execution platform as a service. The SaaS may provide applications as a service.

The IaaS may further include many sub service categories. Mainly, the IaaS may include a storage service and a computing service, which provide computing resources in a form of a virtual machine. Such a storage service may be provided by a distributed storage system. The distributed storage system may virtually create a storage pool using low-profiled hardware distributed over a network. Such a distributed storage system may dynamically and flexibly provide a shared storage space to users according to rapidly and/or abruptly varying service demands. The distributed storage system may commonly employ an object-based storage scheme. The object-based storage scheme may be, for example, a typical cloud storage service scheme. The Object-based storage scheme may allow each physical storage device to manage its own storage spaces. The object-based storage scheme may improve overall performance of the distributed storage system and allow the distributed storage system to easily expand a storage capability. Furthermore, data may be safely shared independently from related platforms.

The typical distributed storage system may include a plurality of data nodes, which are object-based storage devices. The typical distributed storage system may replicate data and store the replicated data in at least one data node for data safety and high data availability. The replicated data may be referred to as a "replica." The distributed storage system may generally have two or three replicas, but may have more than three replicas, depending on an importance of a respective object. The distributed storage system may be required to synchronize the replicas of a respective object. Such synchronization may be processed by an independent replicator server.

After creating replicas, at least one data node may be selected to store the created replicas. Typically, a distributed storage system may randomly select data nodes without considering various factors such as a physical location and a status of each data node.

Since the physical location is not considered for data node selection, data nodes separated from a client at a long distance may be selected. Such selection might cause a great delay for processing respective objects. In addition, data nodes gathered in one specific area may be selected. In this case, when a respective network of the specific area fails, many, if not all, of the data nodes in the specific area may be subject to the malfunction and consequently be unavailable.

Since the status of each data node is generally not considered, a distributed storage system may select data nodes having a high processing load, a slow response speed, and a small available space remained. Accordingly, such data node selection scheme may degrade overall performance of a distributed storage system.

SUMMARY OF THE INVENTION

This summery is provided to introduce a selection of concepts in a simplified form that are further described below in the detailed description with reference to the drawings. This summary is not intended to identify key features or essential features of the claimed subject matter, nor is it intended to limit the scope of the claimed subject matter. Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present invention, replicas may be stored in data nodes selected based on physical locations and real-time status thereof in a distributed storage system.

In accordance with another aspect of the present invention, data nodes and data node groups may be evaluated according to various evaluation items, evaluation item points may be obtained based on the evaluation results, and data nodes may be selected based on the evaluation results of the data nodes.

In accordance with an embodiment of the present invention, statues of data nodes and data node groups may be monitored in real-time and data nodes and data node groups may be selected based on the real-time monitoring result.

In accordance with an exemplary embodiment of the present invention, a server may be provided in a distributed storage system including a plurality of data nodes for providing a storage service. The server may include a receiver configured to receive a replication request and a control unit configured to select data nodes based on at least one of evaluation results and real-time service statuses of the plurality of data nodes.

An evaluation result of each data node may be a sum of points of at least one evaluation item assigned to each data node from evaluation of each data node according to at least one evaluating item.

The at least one evaluation item may include performance, reliability, availability, and scalability. An evaluation result of each data node may be a sum of points of one or more of a performance evaluation item point, a reliability evaluation item point, an availability evaluation item point, and a scalability evaluation item point, associated with each data node based on an evaluation of each data node according to one or more of performance, reliability, availability, and scalability.

The server may include a monitor unit configured to obtain real-time status of a storage service at each data node by monitoring a status of each data node in real-time.

The real-time status may include at least one status item and the real-time status may be a sum of numeric values of the at least one status item.

The status item may include an average service response time, an average service failure rate in a unit time, and a remaining available storage space of each data node.

The server may further include an update unit configured to adjust the evaluation results of the data nodes stored in a database, based on the obtained real-time statuses of the data nodes, and to update the database with the adjustment results.

The control unit may be configured to apply corresponding weights to the evaluation items of the adjusted evaluation results.

The control unit may be configured to determine whether a node group selection policy is applied, to determine a number of replicas created based on the replication request, and to select a number of data node groups based on evaluation results of the data node groups up to the determined number of replicas when the node group selection policy is applied.

A data node group may include data nodes located with a certain area. An evaluation result of each data node group may be an average of evaluation results of data nodes belonging to each data node group.

The control unit may be configured to select a number of data nodes based on the evaluation results of the data nodes up to the determined number of replicas when the node group selection policy is ignored.

The control unit may be configured to generate replicas and to transmit the generated replicas to the selected data nodes, respectively.

The control unit may be configured to request a proxy server to generate replicas and to transmit the generated replicas to the selected data nodes, respectively.

In accordance with another embodiment of the present invention, a method may be provided for selecting data nodes in a distributed storage system. The method may include receiving a replication request, and selecting data nodes based on at least one of evaluation results and real-time service statuses of the plurality of data nodes.

An evaluation result of each data node may be a sum of points of at least one evaluation item assigned to each data node from evaluation of each data node according to at least one evaluating item.

The at least one evaluation item may include one or more of performance, reliability, availability, and scalability. An evaluation result of each data node may be a sum of points of a performance evaluation item point, a reliability evaluation item point, an availability evaluation item point, and a scalability evaluation item point, associated with each data node based on an evaluation of each data node according to one or more of performance, reliability, availability, and scalability.

The method may further include obtaining the real-time status of a storage service at each data node by monitoring a status of each data node in real-time, adjusting the evaluation results of the data nodes, stored in a database, based on the obtained real-time statuses of the data nodes, and updating the database with the adjustment results.

The real-time statuses may include at least one status item and the real-time status may be a sum of numeric values of the at least one status item. The status item may include an average service response time, an average service failure rate in a unit time, and a remaining available storage space of each data node.

The method may further include determining whether a node group selection policy is applied, determining a number of replicas created based on the replication request, selecting a number of data node groups based on evaluation results of the data node groups up to the determined number of replicas when the node group selection policy is applied, and selecting the number of data nodes based on the evaluation results of the data nodes up to the determined number of replicas when the node group selection policy is ignored.

A data node group may include data nodes located with a certain area. An evaluation result of each data node group may be an average of evaluation results of data nodes belonging to each data node group.

BRIEF DESCRIPTION OF THE DRAWINGS

The above and/or other aspects of the present invention will become apparent and more readily appreciated from the following description of embodiments, taken in conjunction with the accompanying drawings, of which.

DETAILED DESCRIPTION OF THE INVENTION

Reference will now be made in detail to embodiments of the present invention, examples of which are illustrated in the accompanying drawings, wherein like reference numerals refer to like elements throughout. The embodiments are described below, in order to explain the present invention by referring to the figures.

Figure 1:
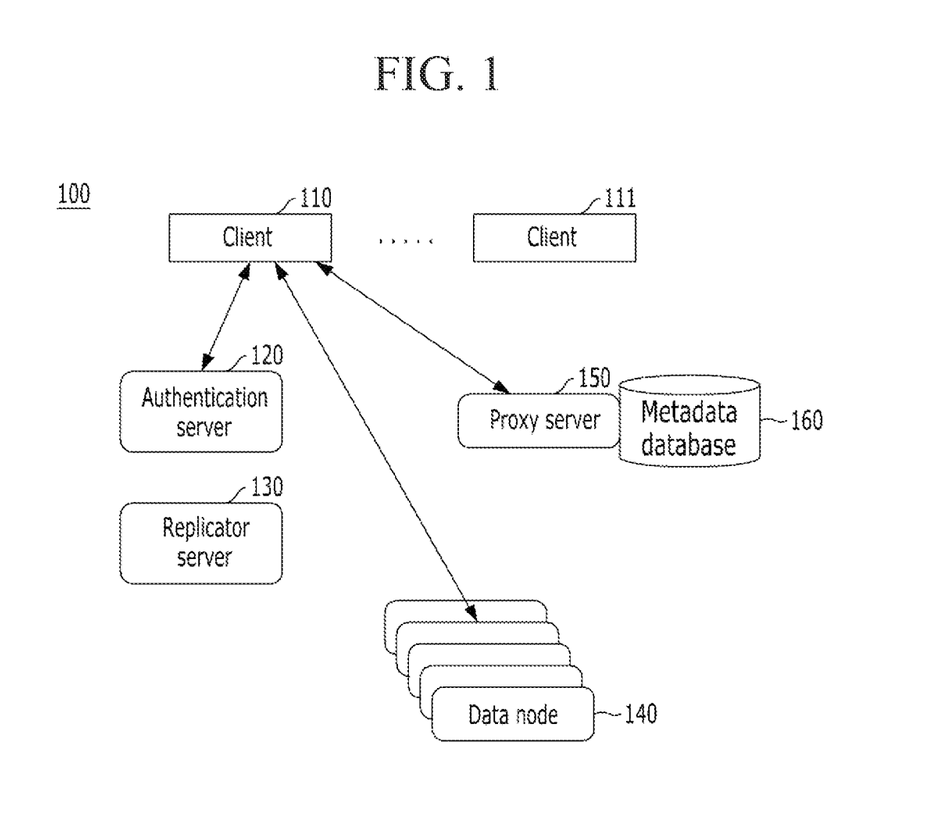
FIG. 1 shows a typical distributed storage system as might benefit from embodiments of the present invention.

FIG. 1 shows a typical distributed storage system as might benefit from embodiments of the present invention. Distributed storage system 100 may provide a storage service to a plurality of clients in response to requests from the clients.

Referring to FIG. 1, distributed storage system 100 may include a plurality of clients shown as clients 110 through 111, authentication server 120, replicator server 130, plurality of data nodes 140, proxy server 150, and metadata database 160. Since behavior of each of clients 110 through 111 might be similar and they might operate in an analogous manner, the following describes behavior and operation of client 110.

Authentication server 120 may authenticate and authorize client 110 accessing distributed storage system 100. Proxy server 150 may sometimes be referred to in the art as a master server. Proxy server 150 may process various requests associated with an object from client 110. For example, proxy server 150 may receive a request for storing an object in distributed storage system 100 and a request for retrieving an object from distributed storage system 100. In response to the storing request, proxy server 150 may select one of data nodes 140 in order to store an object associated with the request. In response to the retrieving request, proxy server 150 may determine a data node storing an object associated with the request from data nodes 140. Metadata database 160 may store and maintain metadata. The metadata may include information on physical locations of objects. Data nodes 140 may be distributed over regions and store and manage replicas and objects. Replicator server 130 may manage object replication. For example, replicator server 130 may create replicas of an object received from client 100. A data channel may be established between client 110 and data nodes 140 and a control channel may be established between client 110 and proxy server 150. Since such communication channels are separated, transmission delay and data traffic may be reduced.

Such typical distributed storage system 100 may operate as follows. At an initial stage, each of clients 110 through 111 may be authenticated and authorized through authentication server 120. After the authentication and authorization process is completed, each of clients 110 through 111 might generate requests for storing and/or retrieving an object in distributed storage system 100. For example, client 110 may request proxy server 150 to send information on data nodes 140 that store and manage desired objects. Proxy server 150 may request one or more of respective data nodes 140 to perform a desired operation based on the metadata in response to the request from the corresponding client 110. Respective data node 140 may perform the requested operation and transmit the operation result to the corresponding client 110 through proxy server 150. In addition, respective data node 140 may directly provide the operation result to client 110, without passing through proxy server 150. Since the plurality of data nodes 140 directly communicate with clients 110 through 111, delay or data traffic may be reduced.

Replicator server 130 may create replicas of an object for improving data safety and availability of the object. Replicator server 130 may distributedly store the created replicas and the object in multiple data nodes 140. Typically, two or three replicas may be created according to a given policy. The number of replicas may differ according to importance of an object, which may be defined in the given policy. Furthermore, it is generally required to synchronize replicas. Replicator server 130 may perform data synchronization among replicas and an original object.

After creating replicas, at least one data node may be selected to store the created replicas. Typically, distributed storage system 100 may randomly select data nodes without considering various actors such as a physical location and a status of each data node.

If the physical location of a data node is not a consideration for data node selection, distributed storage system 100 may select data nodes separated from a client and/or from each other by a relatively great or otherwise long distance, potentially causing a great delay for processing respective objects. For example, a comparatively longer time might be required to input and/or output the respective objects. In addition, distributed storage system 100 may select data nodes gathered in one specific area. When a respective network of the specific area fails, many, if not all, of the data nodes in the specific area may be subject to the malfunction and consequently be unavailable in this case, clients may not use replicas and objects stored in the data nodes located in the specific area.

If the status of each data node is not considered, distributed storage system 100 may select data nodes having a high processing load, a slow response speed, and/or a relatively small amount of remaining available space. Accordingly, such data node selection scheme may degrade overall performance of distributed storage system 100.

In order to overcome such disadvantages of a typical distributed storage system, in accordance with embodiments of the present invention, an object and replicas thereof are stored in data nodes selected based on locations of the data nodes and statuses of the data nodes. Hereinafter, a distributed storage system and a method for selecting data nodes based on locations and statues of data nodes in accordance with embodiments will be described with reference to FIG. 2 to FIG. 4.

Figure 2:
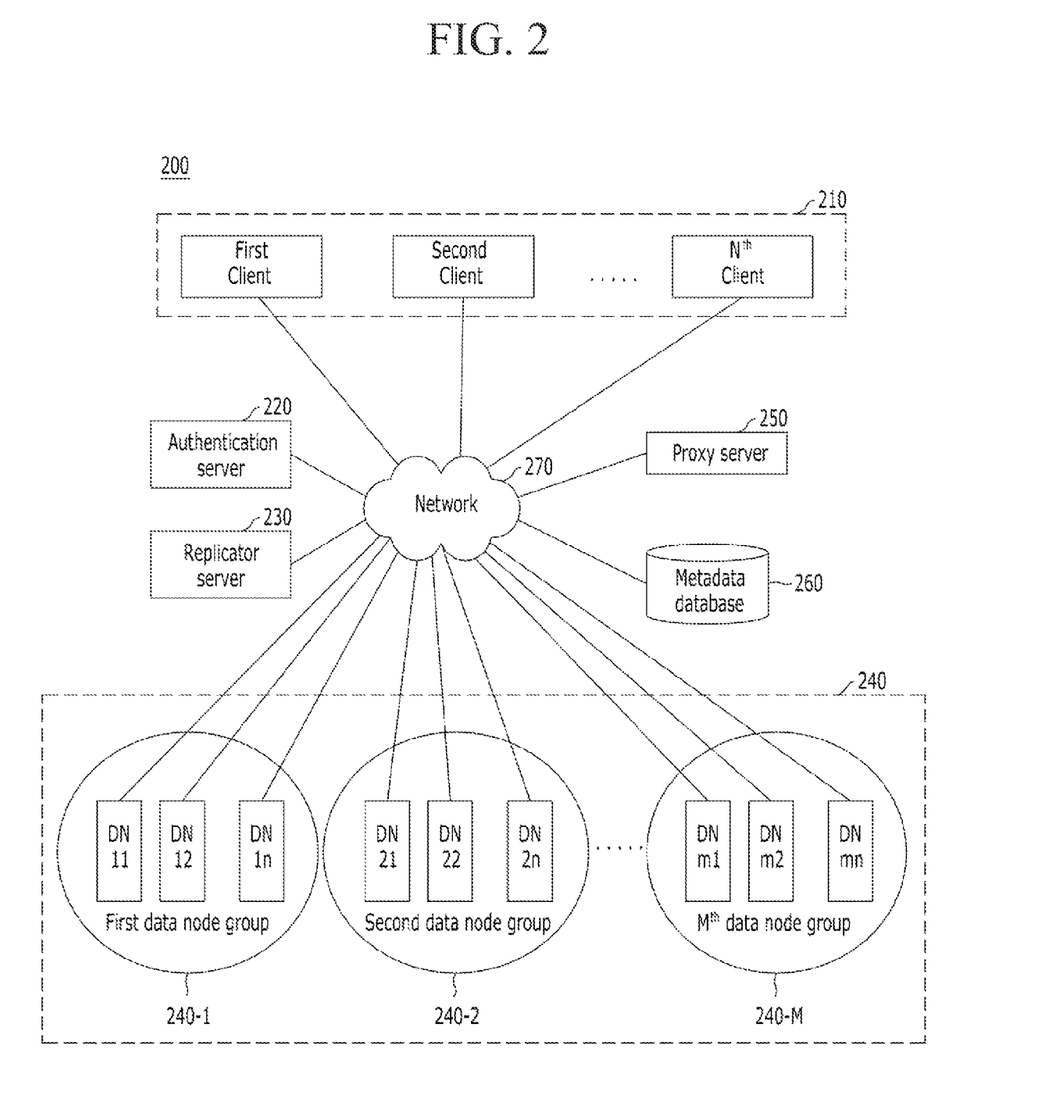
FIG. 2 shows a distributed storage system configured and operating in accordance with an embodiment of the present invention.

FIG. 2 shows a distributed storage system in accordance with an embodiment of the present invention.

Referring to FIG. 2, distributed storage system 200 may include a plurality of clients 210 and a plurality of data nodes DN11 to DN1n, DN21 to DN2n, through DNm1 to DNmn. The plurality of clients 210 and the plurality of data nodes DN11 through DNmn may be coupled through network 270. Each one of clients 210 may denote user equipment accessing distributed storage system 200. Distributed storage system 200 may further include authentication server 220, replicator server 230, proxy server 250, and metadata database 260.

Authentication server 220 may authenticate and authorized one or more of clients 210. Each one of data nodes DN11 to DN1n, DN21 to DN2n, through DNm1 to DNmn may store at least one of an object and replicas thereof. Metadata database 260 may store metadata containing information on the objects and replicas thereof and information on the data nodes DN11 to DN1n, DN21 to DN2n, through DNm1 to DNmn.

Proxy server 250 may process various requests associated with an object from clients 210. For example, proxy server 250 may receive a request for storing an object in distributed storage system 200 and a request for retrieving an object from distributed storage system 200.

Data nodes DN11 to DN1n, DN21 to DN2n, and DNm1 to DNmn may be grouped by locations. As shown in FIG. 2, distributed storage system 200 may group the plurality of data nodes DN11 to DN1n, DN21 to DN2n, and DNm1 to DNmn into the three data node groups of 2401-1, 240-2, and 240-M. Each data node group may include data nodes located in a specific area. Particularly, data nodes DN11 to DN1n may be included in first data node group 240-1, data nodes DN21 to DN2n may be included in second data node group 240-2, and data nodes DNm1 to DNmn may be included in M$^{th}$ data node group 240-M, as shown in FIG. 2. Since the plurality of data nodes DN11 to DN1n, DN21 to DN2n, through DNm1 to DNmn are grouped based on locations thereof, distributed storage system 200 may effectively store an object and replicas thereof in data nodes distributed over a network.

In accordance with an embodiment of the present invention, a replica may be created in a unit of an object or in a unit of a chunk. The chunk may denote one fragment of an object. The object may be divided into a plurality of chunks. When the replica is created in a unit of an object, this replica may be referred to as an "object replica." When the replica is created in a unit of a chuck, this replica may be referred to as a "chunk replica." Since one object is divided into a plurality of chunks, a plurality of related chunk replicas may be required to restore an original object. For convenience and ease of understanding herein, a replica may refer to both the object replica and the chunk replica.

Distributed storage system 200 may distributedly store an object and replicas thereof in data nodes DN11 to DN1n, DN21 to DN2n, through DNm1 to DNmn. Distributed storage system 200 may not necessarily store an object and replicas thereof in data nodes belonging to the same data node group. Particularly, distributed storage system 200 may not necessarily store identical objects in more than one data node belonging to the same data node group. For example, distributed storage system 200 may store an object in a data node of a first data node group and store any replicas of the object in data nodes in data node groups different from the first data node group. Furthermore, distributed storage system 200 may not store replicas of the same object in data nodes belonging to the same data node group. Accordingly, each one of the replicas of an object may be stored in one or more data nodes of different data node groups. Metadata may include information on physical locations of an object and replicas thereof. Particularly, the metadata may include information on mapping relation of objects including replicas thereof and corresponding data nodes that store the objects. The metadata may be stored in metadata database 260.

The above described manner of storing an object and replicas thereof may increase data reliability because replicas of one object are distributively stored in data nodes in different data node groups. For example, when a replica in one data node group is damaged due to errors of a respective network, a user (e.g., through a client) can retrieve another replica stored in a data node in a different data node group. Such a manner may be referred to a node group selection policy.

In accordance with an embodiment of the present invention, a data node group may be a single data center or a single server rack, but the present invention is not limited thereto. After a data node group is defined and a plurality of data nodes are grouped by each data node group, a mapping relation between a data node and a corresponding data node group may be updated in the corresponding metadata. After updating the metadata, replicas of one object may be replicated in respective data nodes in different data node groups.

Replicator server 230 may select data nodes to store an object and chunk replicas thereof. Replicator server 230 may refer metadata stored in metadata database 250 to optimally select the data nodes. The metadata may include information on data nodes DN11 to DN1n, DN21 to DN2n, through DNm1 to DNmn, data node groups 240-1 to 240-M, and relation therebetween. For example, replicator server 230 may select one data node from each data node group 240-1 to 240-M. Replicator server 230 may download related metadata from metadata database 250 into a local database, previously. Replicator server 230 may use the metadata stored in the local database to select a data node from each data node group.

Data replicator server 230 may evaluate data nodes DN11 to DN1n, DN21 to DN2n, through DNm1 to DNmn, and data node groups 240-1 through 240-M according to at least one evaluation and assign certain evaluation item point to each data nodes DN11 to DN1n, DN21 to DN2n, through DNm1 to DNmn, and data node groups 240-1 through 240-M according to the evaluation results. The evaluation item may include performance, reliability, availability, and scalability. For performance, data replicator server 230 may evaluate each data node and each data node group to determine relative speed or relative capacity each data node or each data node group can provide for a cloud storage service. For reliability, data replicator server 230 may evaluate each data node and each data node group to determine relative reliability, such as how long each data node and each data group can provide a cloud storage service without failure. For availability, data replicator server 230 may evaluate each data node and each data node group to determine how much storage space each data node and each data group can provide. For scalability, data replicator server 230 may evaluate each data node and each data node group to determine how much each data node and each data group can expand its capability. After evaluating each data node and each data node group, each evaluation result of each evaluation item may be calculated as an evaluation item point.

Replicator server 230 may monitor data nodes DN11 to DN1n, DN21 to DN2n, through DNm1 to DNmn and data node group 240-1 through 240-M and collect a status of each data node and each data group, regularly and/or in real time. The status may include various status items including an average service response time, an average service failure rate, and a remaining available storage space. Replicator server 230 may select data nodes based on the evaluation results and the monitoring results in order to provide an optimal storage service to clients 210. A structure and operation of replicator server 230 will be described, in detail, with reference to FIG. 3.

In accordance with an embodiment of the present invention, clients 210 and data nodes DN11 to DN1n, DN21 to DN2n, through DNm1 to DNmn may communicate with each other over network 270. That is, virtual channels may be established between N clients (clients 210) and the respective data nodes DN11 to DN1n, DN21 to DN2n, through DNm1 to DNmn. However, the virtual channels may not necessarily always have the same conditions with respect to pairs of one of clients 210 and one of data nodes DN11 to DN1n, DN21 to DN2n, through DNm1 to DNmn. For example, conditions of such a virtual channel may be dynamically changed according to various factors such as physical distances between a client and a corresponding data node, an amount of network traffic and/or performance of network resources configuring a respective virtual channel. As the amount of the network traffic over a respective virtual channel is comparatively large, transmission collision is highly likely to occur on the respective virtual channel. As the performance of the network resources is comparatively higher, the transmission/reception speed of the virtual channels may become faster and an average response time may become shortened.

In addition, performance, availability, and scalability of each data node may vary according to a communication environment of a virtual communication channel, specification and performance of hardware equipment configuring each data node, and an available storage space of each data node.

Figure 3:
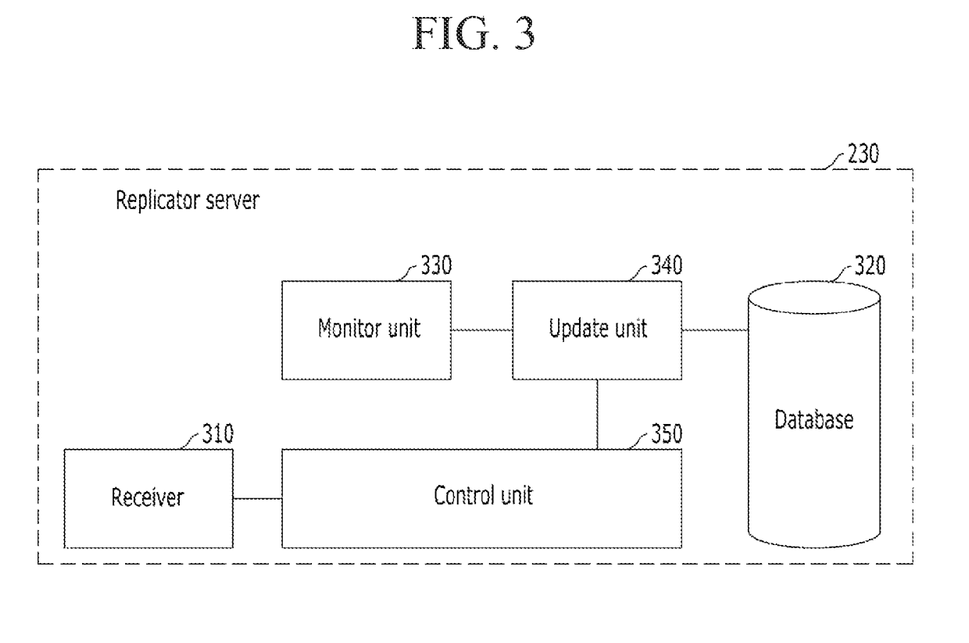
FIG. 3 shows a replicator server in accordance with an embodiment of the present invention.

FIG. 3 shows a replicator server in accordance with an embodiment of present invention.

Referring to FIG. 3, replicator server 230 may include receiver 310, database 320, monitor unit 330, update unit 340, and control unit 350.

Receiver 310 may receive a replication request from proxy server 250. Particularly, when proxy server 250 receives a file storage request from one of clients 210, proxy server 250 may transmit the replication request to replicator server 230. The replication request may include information on the number of chunk replicas to be created. The present invention, however, is not limited thereto. For example, receiver 310 may receive a replication request from a metadata server (not shown) or directly from a client. Particularly, clients 210 may transmit a replication request directly to replicator server 230 after clients 210 obtains information on the number of chunk replicas from proxy server 250 or metadata server. Furthermore, the number of chunk replicas may be decided by clients 210 that request a distributed storage service of an object.

Database 320 may store evaluation results of data node groups and data nodes and a mapping table of the data node groups associated with the data nodes. Furthermore, database 320 may store service statuses of data node groups and data nodes. Such service statuses of data node groups and data nodes may be monitored in real-time and updated based on the real-time monitoring results.

The evaluation results may be results of evaluating data node groups and data node according to evaluation items. The evaluation item may include performance, reliability, availability, and scalability. After evaluating each data node and each data node group according to the evaluation items, evaluation item points may be determined based on the evaluating results and assigned to each data node group or each data node.

Such evaluation results may be provided by a system manager of distributed storage system 200 or a storage service provider. In this case, the system manager or the storage service provider may calculate the evaluation results of the evaluation items in consideration of specification and performance of hardware equipments included in distributed storage system 200 and an application programming interface (API) that supports a file system, in software manner, of distributed storage system 200.

The evaluation results may be automatically calculated by replicator server 230. In this case, replicator server 230 may perform simulations using a simulation model with specification and performance of hardware equipments included in distributed storage system 200 and an API that supports a file system, in software manner, of distributed storage system 200. As a result of simulation, the evaluation results of the evaluation items may be automatically generated and the evaluation item points may be assigned to each data node group and each data node. The present invention, however, is not limited thereto.

Monitor unit 330 may monitor a service status of each data node group and each data node in real-time. The service status may denote a status of each data node or each data node group for providing a cloud storage service. The service status may include multiple status items; for example, an average service response time, an average service failure rate in a unit time, and an available storage space. For example, the service status of each data node and each data node group may be monitored regularly at a certain interval. The status items may be expressed as a numeric value.

Monitor unit 330 may receive the service status of each data node and each data node group from an operation system of each data node, a hypervisor, and/or a virtual machine monitor (VMM). The service status of each of the data node groups may be obtained in real time by calculating average of the service statuses of data nodes included in a corresponding data node group.

Update unit 340 may retrieve evaluation results of data node groups and data nodes from database 320 and be provided with the monitored service statuses of data nodes and data node groups from monitor unit 330. Particularly, update unit 340 may adjust each evaluation item point with related status item. For example, update unit 340 may adjust the retrieved evaluation results based on the provided real-time service statuses. For example, update unit 340 may adjust a performance evaluation item point based on an average response time of the real-time service status. Update unit 340 may adjust a reliability evaluation item point based on an average service failure rate in a unit time. Update unit 340 may adjust an availability evaluation item point based on a remaining available storage space of each data node and each data node group. As described above, update unit 340 may increase or decrease each evaluation item point based on a related status item. After adjustment, update unit 340 may update the adjusted evaluation results to database 320.

Control unit 350 may select data nodes to store the chunk replicas based on the evaluation results stored in database 320. Control unit 350 may determine the number of chunk replicas to be created based on the replication request. The replication request may include information on the number of chunk replicas to be created. Control unit 350 may select a number of data nodes up to as many as the number of chunk replicas. Accordingly, in preferred embodiments, the number of selected data nodes may be equivalent to the number of chunk replicas.

After selecting data nodes, control unit 350 may request proxy server 250 to create the chunk replicas and transmit the created chunk replicas to the selected data nodes. In response to the request, proxy server 250 may create chunk replicas of an object received from the corresponding one of clients 210 and transmit the created chunk replicas to the selected data nodes, respectively. The present invention, however, is not limited thereto. Replicator server 230 may directly create the chunk replicas and transmit the created chunk replicas to the selected data nodes.

For selecting data nodes, a node group selection policy may be used. Accordingly, control unit 350 may determine whether a node group selection policy is applied. When the node group selection policy is applied, control unit 350 may i) select data node groups and ii) select one data node from each data node group. Particularly, control unit 350 may select data node groups as many as the number of chunk replicas based on the evaluation results of the data node groups. Then, control unit 350 may select one data node from each one of the selected data node groups based on the evaluation results of the data nodes. As a result, the selected data nodes may belong to different data node groups, respectively.

When the node group selection policy is not necessarily applied, control unit 350 may select data nodes based on evaluation results of data nodes, without considering evaluation results of data node groups. Control unit 350 may be set up to use the node group selection policy by a manager of distributed storage system 200 or a storage service provider.

In order to select optimal data nodes, control unit 350 may calculate an evaluation result of each data node or each data node group as follows. Control unit 350 may assign a certain weight to each evaluation item point. For example, a weight of 2 may be assigned to such as a performance evaluation item point, weight of 3 may be assigned to a reliability evaluation item point, and a weight of 3 may be assigned to an availability evaluation item point. Control unit 350 may multiply the assigned points to corresponding evaluation item points, respectively. Control unit 350 may add all evaluation item points together and decide the adding result as an evaluation result of each data node and each data node group. Control unit 350 may select a data node or a data node group having the highest evaluation result first. In this manner, control unit 350 may optimally select data nodes or data node groups.

The weight may be determined based on priority received from a client. For example, replicator server 230 may receive priorities of evaluation parameters from client 210 and automatically decide the weight for each evaluation item point. In this case, control unit 350 may dynamically change the weights according to the priorities from client 210. The present invention, however, is not limited thereto. The weight may be determined by a manager of distributed storage system 200 and a cloud storage service provider.

Figure 4:
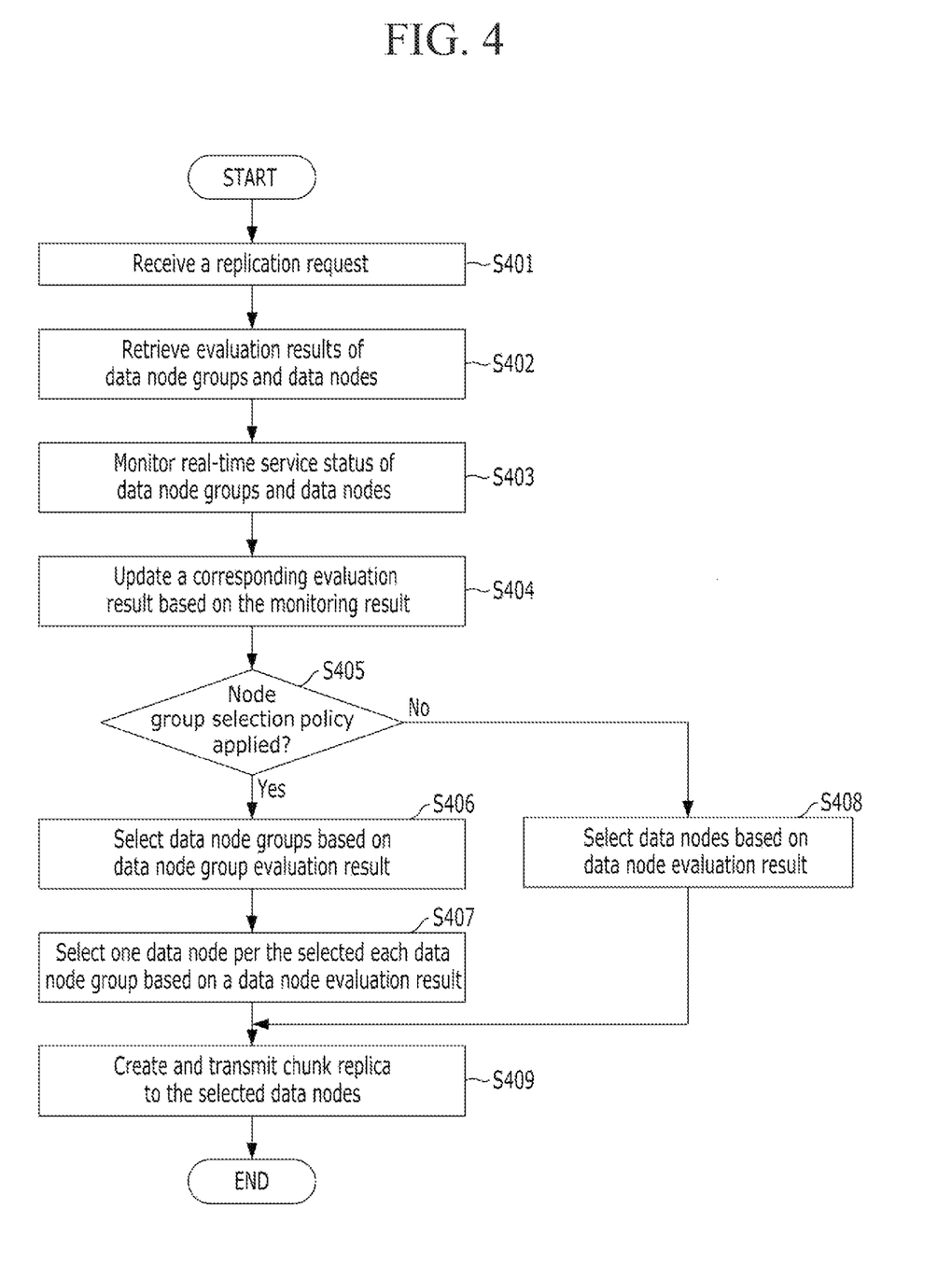
FIG. 4 shows a method for selecting data nodes to store chunk replicas in a distributed storage system in accordance with an embodiment of the present invention.

FIG. 4 shows a method for selecting data nodes to store chunk replicas in a distributed storage system in accordance with an embodiment of the present invention.

Referring to FIG. 4, a replication request may be received at step S401. For example, replicator server 230 may receive the replication request from proxy server 250. The present invention, however, is not limited thereto. Replicator server 230 may receive the replication request from or a metadata server. Furthermore, replicator server 230 may directly receive the replication request from client 210. The replication request may include the number of chunk replicas to be created.

At step S402, evaluation results of data node groups and data nodes may be retrieved. For example, replicator server 230 may retrieve evaluation results of data node groups and data nodes, which are previously stored in database 320 in response to the replication request. The evaluation results may be obtained by evaluating a data node or a data node group according to a corresponding evaluation item. The evaluation item may include performance, reliability, availability, and scalability. After evaluating each data node and each data node group, each evaluation result of each evaluation item may be calculated as an evaluation item point. Accordingly, the evaluation result of a data node or a data node group may include at least one evaluation item point.

At step S403, service statuses of data node groups and data nodes may be monitored in real time. For example, replicator server 230 may monitor the service status of data node groups and data nodes in real time. The steps S402 and S403 may be performed in parallel manner, but the present invention is not limited thereto. The steps S402 and S403 may be performed in series manner.

At step S404, the retrieved evaluation results may be adjusted and updated based on the monitored service statuses. For example, replicator server 230 may adjust the retrieved evaluation results based on the service statuses of and update the evaluation results based on the controlled evaluation results.

At step S405, determination may be made as to whether a node group selection policy is applied. Replicator server 230 may determine whether a node group selection policy is applied. For example, distributed storage system 200 may be set up so as to be applied with a node group selection policy by a manager of distributed storage system 200 or a storage service provider. The node group selection policy may be a policy that restricts distributed storage system 200 from storing chunk replicas of an object in data nodes belonging to the same data node group.

When it is determined that the node group selection policy is applied (Yes-S405), data node groups may be selected based on the evaluation results as many as the number of chunk replicas to be created at step S406. For example, replicator server 230 may select data node groups as many as the number of chunk replicas. For selection, the evaluation results of the data node groups may be referred. The evaluation results may be stored in database 320 of replica server 230. Furthermore, the evaluation result may be monitored and updated in real time based on the monitoring result.

At step S407, one data node may be selected from each one of the selected data node groups based on the evaluation results of data nodes. For example, replicator server 230 may select one data node from each one of the selected data node groups based on the evaluation results of data nodes. As a result, data nodes are selected as many as the number of chunk replicas and each one of the selected data des belongs to different data node groups.

When it is determined that the node group selection policy is not applied (No-S405), at step S408, data nodes may be selected as many as the number of chunk replicas based on the evaluation results of data nodes. For example, replicator server 230 may select data nodes based on the evaluation results of data nodes, stored in database 320.

At step S409, chunk replicas may be created and transmitted to the selected data nodes, respectively. For example, replicator server 230 may create chunk replicas and transmit the created chunk replicas to the selected data nodes. The present invention, however, is not limited thereto. Replicator server 230 may request proxy server 250 to create chunk replicas. In response to the request, proxy server 250 may create chunk replicas and transmit the created chunk replicas to the data nodes selected by replicator server 230.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. §112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A server in a distributed storage system including a plurality of data nodes for providing a storage service, the server comprising:
    a receiver configured to receive a replication request; and
    a control processor configured to select data node groups based on evaluation results and real-time service statuses of the data node groups up to a number of replicas to be created based on a node group selection policy for restricting replicas of an object from being stored in data nodes belonging to a same data node group, and to select one data node from each one of the selected data node groups based on evaluation results and real-time service statues of the data nodes,
    wherein an evaluation result of each data node is a sum of points of evaluation items assigned to each data node from evaluation of each data node according to the evaluating items, and
    wherein the evaluation item includes performance, reliability, availability, and scalability and an evaluation result of each data node is a sum of points of a performance evaluation item point, a reliability evaluation item point, an availability evaluation item point, and a scalability evaluation item point, associated with each data node based on an evaluation of each data node according to one or more of performance, reliability, availability, and scalability.

2. The server of claim 1, comprising:
    a monitor processor configured to obtain real-time status of a storage service at each data node by monitoring a status of each data node in real-time.

3. The server of claim 2, wherein the real-time status includes at least one status item and the real-time status is a sum of numeric values of the at least one status item.

4. The server of claim 3, wherein the status item includes an average service response time, an average service failure rate in a unit time, and a remaining available storage space of each data node.

5. The server of claim 2, further comprising:
    an update processor configured to adjust the evaluation results of the data nodes stored in a database, based on the obtained real-time statuses of the data nodes, and to update the database with the adjustment results.

6. The server of claim 5, wherein the control processor is configured to apply corresponding weights to the evaluation items of the adjusted evaluation results.

7. The server of claim 1, wherein the control processor is configured to:
    determine whether the node group selection policy is applied;
    determine a number of replicas created based on the replication request; and
    select a number of data node groups based on evaluation results of the data node groups up to the determined number of replicas when the node group selection policy is applied.

8. The server of claim 1, wherein:
    a data node group includes data nodes located with a certain area; and
    an evaluation result of each data node group is an average of evaluation results of data nodes belonging to each data node group.

9. The server of claim 1, wherein the control processor is configured to select a number of data nodes based on the evaluation results of the data nodes up to the determined number of replicas when the node group selection policy is ignored.

10. The server of claim 1, wherein the control processor is configured to generate replicas and to transmit the generated replicas to the selected data nodes, respectively.

11. The server of claim 1, wherein the control processor is configured to request a proxy server to generate replicas and to transmit the generated replicas to the selected data nodes, respectively.

12. A method for selecting data nodes in a distributed storage system, the method comprising:
    receiving a replication request;
    selecting data node groups based on evaluation results and real-time service statuses of the data node groups up to a number of replicas to be created based on a node group selection policy for restricting replicas of an object from being stored in data nodes belonging to a same data node group; and
    selecting one data node from each one of the selected data node groups based on evaluation results and real-time service statues of the data nodes,
    wherein an evaluation result of each data node is a sum of points of evaluation items assigned to each data node from evaluation of each data node according to the evaluating items, and
    wherein the evaluation item includes one or more of performance, reliability, availability, and scalability, and an evaluation result of each data node is a sum of points of a performance evaluation item point, a reliability evaluation item point, an availability evaluation item point, and a scalability evaluation item point, associated with each data node based on an evaluation of each data node according to performance, reliability, availability, and scalability.

13. The method of claim 12, further comprising:
    obtaining the real-time status of a storage service at each data node by monitoring a status of each data node in real-time;
    adjusting the evaluation results of the data nodes, stored in a database, based on the obtained real-time statuses of the data nodes; and
    updating the database with the adjustment results.

14. The method of claim 13, wherein:

the real-time statuses include at least one status item and the real-time status is a sum of numeric values of the at least one status item; and the status item includes an average service response time, an average service failure rate in a unit time, and a remaining available storage space of each data node.

15. The method of claim 12, further comprising:

determining whether the node group selection policy is applied;

determining a number of replicas created based on the replication request;

selecting a number of data node groups up to the determined number of replicas when the node group selection policy is applied; and selecting a number of data nodes based on the evaluation results and the real-time service status of the data nodes up to the determined number of replicas when the node group selection policy is ignored.

16. The method of claim 12, wherein:

a data node group includes data nodes located with a certain area; and an evaluation result of each data node group is an average of evaluation results of data nodes belonging to each data node group.

17. A server in a distributed storage system including a plurality of data nodes for providing a storage service, the server comprising:

a receiver configured to receive a replication request; and a control processor configured to select data nodes based on at least one of evaluation results and real-time service statuses of the plurality of data nodes, wherein the control processor is configured to:

determine whether a node group selection policy is applied;

determine a number of replicas created based on the replication request;

select data node groups based on evaluation results of the data node groups up to the determined number of replicas when the node group selection policy is applied; and select a data node from each one of the selected data node group based on evaluation results and real-time service statuses of a plurality of data nodes included in a corresponding data node group, wherein the node group selection policy restricts replicas of one object from being stored in data nodes belonging to a same data node group.

18. The server of claim 17, wherein:

a data node group includes data nodes located with a certain area; and an evaluation result of each data node group is an average of evaluation results of data nodes belonging to each data node group.

* * * * *

UNITED STATES PATENT AND TRADEMARK OFFICE
CERTIFICATE OF CORRECTION

PATENT NO. : 8,849,756 B2  
APPLICATION NO. : 13/446052  
DATED : September 30, 2014  
INVENTOR(S) : Mi-Jeom Kim et al.

Page 1 of 1

It is certified that error appears in the above-identified patent and that said Letters Patent is hereby corrected as shown below:

In the Claims

In claim 7, column 14, lines 10-11, "based on evaluation results of the data node groups" should be deleted.

Signed and Sealed this  
Thirtieth Day of December, 2014

Michelle K. Lee  
*Deputy Director of the United States Patent and Trademark Office*